April 8, 1930.  L. S. WILBUR  1,753,763
SPLICE BAR OR FISHPLATE
Filed June 24, 1929
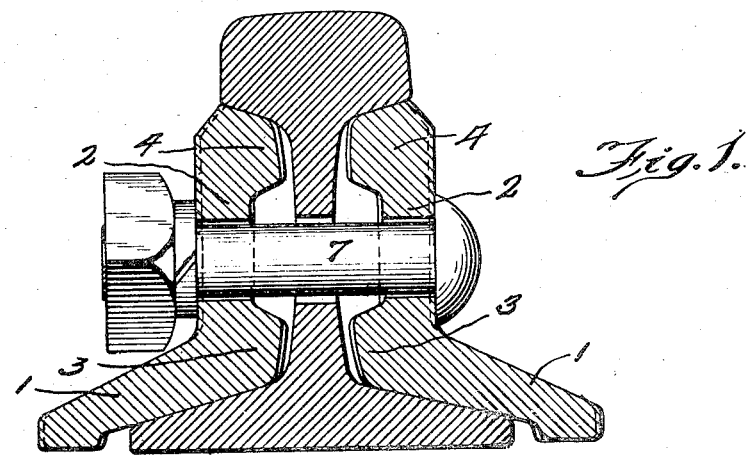
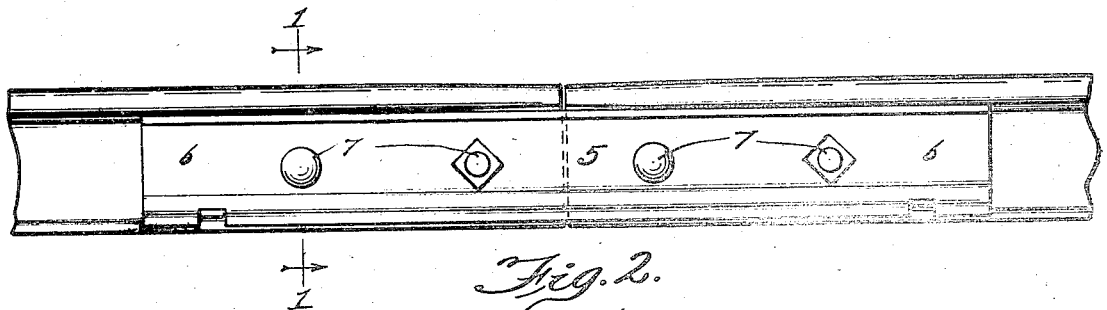
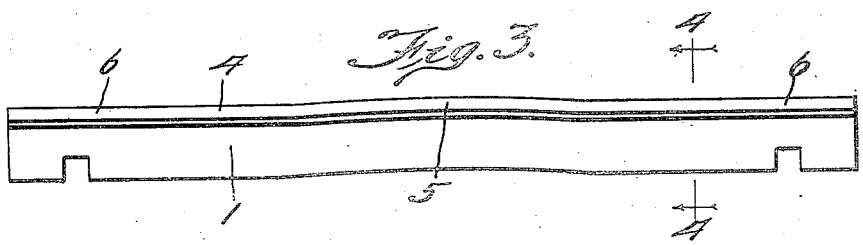
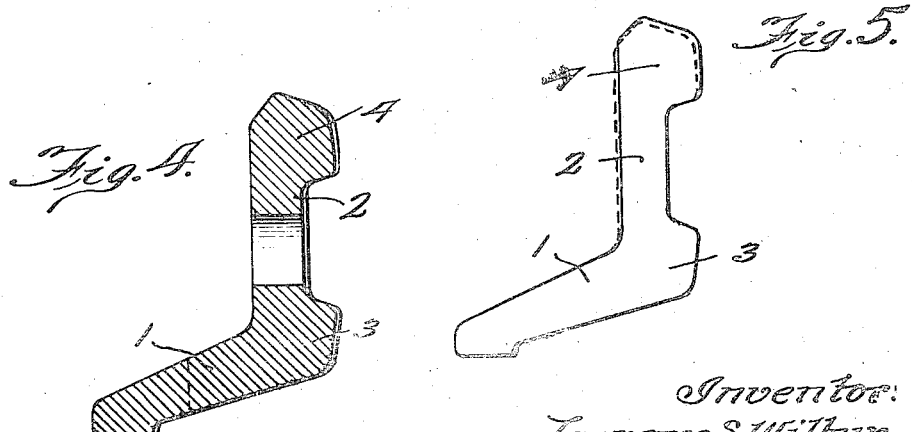
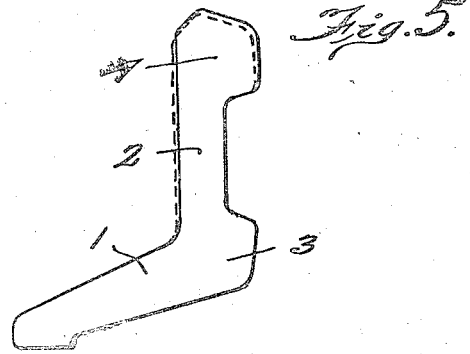
Inventor:
Lawrence S. Wilbur
By Arthur F. Durand
Atty.

Patented Apr. 8, 1930

1,753,763

UNITED STATES PATENT OFFICE

LAWRENCE S. WILBUR, OF EVANSTON, ILLINOIS

SPLICE BAR OR FISHPLATE

Application filed June 24, 1929. Serial No. 373,285.

This invention relates to angle bars or splice bars or fish plates, such as those employed on rail joints. Also, the invention relates to the re-forming of old splice bars, after they have become distorted by the hammering of the car wheels and the creeping action of the rails, in order to adapt them for further use.

Generally stated, the object of the invention is to provide a splice bar or fish plate of uniform fishing height, but which is bulged inwardly at the middle thereof, leaving the two end portions of the bar straight and in exact alignment with each other, thus adapting the bar for use on old and distorted rails.

It is also an object to provide certain details and features of construction and method steps tending to increase the general efficiency and desirability of a splice bar of this particular character, and of the method of reforming old bars, as hereinafter set forth.

To the foregoing and other useful ends, the invention consists in matters hereinafter set forth and claimed and shown in the accompanying drawings, in which—

Fig. 1 is a vertical cross section of a rail joint having splice bars or fish plates formed in accordance with the principles of the invention, being a vertical cross section, on a larger scale, on Fig. 2 of the drawings.

Fig. 2 is a side elevation, on a smaller scale, of said rail joint.

Fig. 3 is a plan view of the splice bar shown in Fig. 2 of the drawings.

Fig. 4 is a vertical cross section on line 4—4, on a larger scale, in Fig. 3 of the drawings.

Fig. 5 is a diagrammatic end elevation of the bar or fish plate, showing the method of producing the bar by re-shaping or re-forming an old bar.

As thus illustrated, the invention comprises a splice bar having a bottom flange 1, a vertical body portion 2, with an enlargement 3 forming the foot or heel of the bar, and with an enlargement 4 to form the top of the bar.

The middle portion of the bar is sprung or bulged inwardly at 5, as shown more clearly in Fig. 3, at both top and bottom of the bar, whereby there is an inwardly curved middle portion 5 between the two straight end portions 6, these two end portions being straight and in alignment with each other. As shown in Fig. 2 of the drawings, the splice bar or fish plate is of uniform fishing height.

Preferably, the splice bar or fish plate shown and described is made by re-forming or re-shaping an old bar. In such case, the fishing height of the bar is increased somewhat, while the old bar is being re-shaped or re-formed to provide the curved middle portion 5 and the straight end portions 6 previously described.

In Fig. 5, the dotted lines show the cross sectional outline of the old splice bar, before it was re-shaped or re-formed, while the full lines show the new outline thereof. From this it will be seen that the web or upright portion 2 has been reduced in thickness, to some extent, in order to increase the height of the bar.

As shown in Fig. 2 of the drawings, the distortion of the rails is greatest at the ends thereof, but the under sides of the treads of the rails and the tops of the lower flanges of the rails are worn away, to some extent, throughout the length of the splice bars or fish plates, or throughout the length of the rail joint. Hence the desirability of increasing the fishing height of the splice bar, when it is made or produced by re-shaping or re-forming an old bar, and when the splice bars are to be used on old rails. In this way, the bottoms and tops of the bars will properly engage the rails, throughout the length of the end portions 6 of the bar, and the greater distortion of the rails at the ends thereof is taken care of by the inward curve or bulge of the bar at the middle thereof, whereby when the bar is drawn tightly into place by the bolts 7, the top and also the bottom of the bar will have proper engagement with the rails throughout the length of the bar.

With the construction shown and described, the bolts 7 can be tightened from time to time, as the splice bars or fish plates gradually become loose, and the formation of the bar will insure proper engagement with the rails, whenever the bolts are tightened. In this way the splice bar or fish plate can be used on badly worn or distorted old rails.

In Fig. 1, the dotted lines indicate the cross sectional contour of each bar at the middle thereof, where the bar is curved or bulged inwardly. As shown, the inward bulge is curved, but it may be formed in any suitable manner, in order to make the bar extend inwardly farther at its middle than at its ends.

The splice bar or fish plate shown and described can be either a new bar, or an old bar re-shaped or re-formed. In some ways it is more practical to make such a bar by taking an old bar and re-shaping or re-forming it in the desired manner. If the bars are new bars, never before used, then the vertical or upright portion of each bar can be of any suitable or desired thickness. However, when the bars are produced from old and worn or distorted bars, then the increased fishing height of the bar can only be obtained by a redistribution of the metal of the bar, and one way of doing this is by reducing the thickness of the vertical or upright portion of the bar.

What I claim as my invention is:

1. In a rail joint, a splice bar or fish plate having an inwardly curved middle portion, and having straight end portions in alignment with each other.

2. A structure as specified in claim 1, said bar having a lower flange.

3. A structure as specified in claim 1, the bar being curved inwardly as stated at both the top and bottom thereof.

4. A structure as specified in claim 1, said bar having a bottom flange, and this flange being curved with the middle portion of the bar, when the bar is viewed from above.

5. A structure as specified in claim 1, said bar being if uniform fishing height throughout the length thereof.

6. A structure as specified in claim 1, the rails if the joint being distorted at the ends thereof, thereby accommodating said inwardly curved middle portion of the bar, providing top and bottom engagement of the bar throughout the length thereof.

7. A structure as specified in claim 1, said bar being a re-shaped or re-formed old bar of greater fishing height than the original bar, and the rails of the joint being old rails that have become worn and distorted by use.

8. A rail joint comprising old rails that have become worn or distorted by use, and a splice bar of uniform fishing height formed from an old bar and of greater fishing height than the original bar.

9. A structure as specified in claim 8, said bar being bulged inwardly at its middle portion.

10. A structure as specified in claim 8, said bar having a bottom flange, and the upright portion of said bar being of less thickness than the original bar.

11. A rail joint comprising old rails that have become worn or distorted by use, and a splice bar thereon of greater fishing height than the bar originally on said joint.

12. A structure as specified in claim 11, said bar being bulged inwardly at its middle portion.

13. A structure as specified in claim 11, said bar having a bottom flange.

Specification signed this 21st day of June, 1929.

LAWRENCE S. WILBUR.